United States Patent
Spenceley et al.

(10) Patent No.: US 7,093,856 B2
(45) Date of Patent: Aug. 22, 2006

(54) TRUCK TANK FOR ACCOMMODATING A BED-MOUNTED HITCH

(75) Inventors: J. W. (Bill) Spenceley, Lethbridge (CA); William D. Oliver, Lethbridge (CA)

(73) Assignees: Flexahopper Plastics Ltd., Lethbridge (CA); J. W. Spenceley, Lethbridge (CA)

( * ) Notice: Subject to any disclaimer, the term of this patent is extended or adjusted under 35 U.S.C. 154(b) by 187 days.

(21) Appl. No.: 10/386,604

(22) Filed: Mar. 13, 2003

(65) Prior Publication Data

US 2004/0178204 A1    Sep. 16, 2004

(51) Int. Cl.
*B60P 3/22*  (2006.01)
(52) U.S. Cl. .................... 280/838; 280/839
(58) Field of Classification Search ............ 280/152.1, 280/152.2, 854, 158.1, 152.3, 848, 159, 304.3, 280/830, 831, 838, 757, 834; 180/219, 220, 180/89.1, 838, 830, 831, 757, 834; 224/423, 224/419, 427, 428, 404; 220/555, 562, 564, 220/212.5; 296/37.6, 100.06, 296; 137/899, 137/899.3
See application file for complete search history.

(56) References Cited

U.S. PATENT DOCUMENTS

| | | |
|---|---|---|
| 707,922 A | 8/1902 | Hedstrom |
| 1,797,217 A * | 3/1931 | McMahon ................. 280/830 |
| 2,168,615 A * | 8/1939 | Bernstein ................... 220/562 |
| 2,271,660 A * | 2/1942 | Norbom ..................... 220/562 |
| 2,632,577 A * | 3/1953 | Sacco ........................ 220/564 |
| 3,770,060 A | 11/1973 | Forsyth et al. |
| 3,854,621 A * | 12/1974 | Parry ......................... 220/554 |
| 4,577,719 A | 3/1986 | Nomura et al. |
| 4,702,339 A | 10/1987 | Hayashi et al. |
| 4,802,682 A | 2/1989 | Yasuji |
| 4,901,813 A | 2/1990 | Kimura et al. |
| 4,915,188 A | 4/1990 | Ota et al. |
| 5,044,646 A | 9/1991 | Iiga et al. |
| 5,056,856 A | 10/1991 | Pederson |
| 5,098,019 A | 3/1992 | Landefeld |
| 5,785,485 A | 7/1998 | Hall |
| 5,934,736 A | 8/1999 | Luke |
| 5,964,495 A | 10/1999 | Blanton |
| 5,992,915 A | 11/1999 | Thompson et al. |
| 6,039,203 A * | 3/2000 | McDaniel ................. 220/562 |
| 6,138,853 A * | 10/2000 | Frechette ................ 220/212.5 |
| 6,247,265 B1 | 6/2001 | Maze et al. |
| 6,378,643 B1 * | 4/2002 | Galbraith et al. .......... 180/219 |

(Continued)

FOREIGN PATENT DOCUMENTS

JP    402136385 A    5/1990

(Continued)

OTHER PUBLICATIONS www.plastictanks.ca/truck.php#Anchor-20941, Oct. 31, 2002, 5 pages.

(Continued)

*Primary Examiner*—Hau Phan
(74) *Attorney, Agent, or Firm*—Sean W. Goodwin (57) ABSTRACT

A truck tank to be carried in the bed of a pickup truck equipped with a bed-mounted hitch. The tank is profiled to fit within the wheel wells of the truck bed and to have either an arched recess formed in the bottom to accommodate the hitch when the tank is lifted into the bed or alternatively, an arched groove extending from the arched recess to the side of the tank so as to permit the tank to be slid into the truck bed.

11 Claims, 9 Drawing Sheets
(1 of 9 Drawing Sheet(s) Filed in Color)

U.S. PATENT DOCUMENTS 6,520,275 B1 * 2/2003 Galbraith et al. ............ 180/219
6,729,516 B1 * 5/2004 Hanagan ..................... 224/423

FOREIGN PATENT DOCUMENTS

| JP | 402136386 A | 5/1990 |
| JP | 402144268 A | 6/1990 |
| JP | 404031190 A | 2/1992 |
| JP | 404166485 A | 6/1992 |

OTHER PUBLICATIONS www.norwesco. com/Index.cfm?Section+WWM&PageWWM08, Nov. 14, 2002, 1 page.

www.plastictanks.ca/newphp#Anchor-65491, Oct. 31, 2002, 6 pages.

www.watertanks.com/category.asp?404;http://www.watertanks. . . Nov 14, 2002, 1 page.

http://www.watertanks.com/drawing/308/category/152/product/0175. . . Nov. 14, 2002, 1 page.

http://www.watertanks.com/drawing/1622/category/152/product/017 . . . Nov. 14, 2002, 1 page.

http://www.watertanks.com/drawing/1623/category/152/product/017 . . . .Nov. 14, 2002, 1 page.

http://www.watertanks.com/category.asp?404;http://www.watertanks. . . Nov. 14, 2002, 1 page.

http://www.watertanks.com/drawing/618/category/9/product/0185-005/ Nov. 14, 2002, 1 page.

http://www.watertanks.com/drawing/620/category/9/product/0185-015/ Nov. 14, 2002, 1 page.

http://www.watertanks.com/drawing/622/category/9/product/0185-025/ Nov. 14, 2002, 1 page.

* cited by examiner

TRUCK TANK FOR ACCOMMODATING A BED-MOUNTED HITCH

FIELD OF THE INVENTION

The present invention relates generally to truck tanks and in particular to thermoplastic tanks for use on truck beds having bed-mounted hitches.

BACKGROUND OF THE INVENTION

Tanks placed on the beds of pick-up trucks have long been used to transport liquids. Such tanks can be made of a variety of materials, however, one-piece truck tanks can molded out of polyethylene, or some other type of thermoformed or rotomolded thermoplastic. Plastic tanks are increasingly popular due to their strength, lack of joints or seams to leak, ability to carry potable drinking water, low cost and corrosion-resistance.

Large capacity thermoplastic tanks all have a substantially flat bottom which engages with the truck's bed for supporting the weight of stored liquid. For example, American Tank Company of Windsor, Calif., U.S.A. manufactures flat-bottomed rectangular and dome-top pick-up truck tanks in a variety of sizes. These tanks can hold from 180 to 425 US gal.; of liquid and are rated for liquids weighing up to 12.5 lbs. per US gal.; holding from 2100 to 5000 pounds of liquid or more when full.

Pick-up trucks may also be provided with trailer hitches which, rather than mounting to the rear of the vehicle, are secured to the bed or frame of the truck approximately between the wheel wells. These bed-mounted types of hitches come in a variety of designs, including the commonly known fifth wheel hitches and goose neck hitches. While these types of hitches provide greater towing capacity, they also preclude the use of these large capacity flat-bottomed thermoplastic truck tanks without removal of the hitch. This is especially true for the fifth wheel type of hitch, which may take up most of the volume or space between the wheel wells. Goose-neck hitches typically have a ball extending 4 to 5 inches upwardly from the bed between the wheel wells, which preclude the use of the traditional large capacity flat-bottomed thermoplastic truck tanks; as they can puncture the tank.

Goose-neck hitches are an especially popular type of hitch for towing horse trailers and are therefore often installed on agricultural work trucks. As a work truck is often used alternately between towing a trailer and hauling tanks of liquid such as water, a goose-neck hitch becomes a common impediment to the installation of the tank. Typically, one must first remove the goose-neck's ball and any ancillary components so as to permit a flat-bottomed truck tank to be placed on the bed of the work truck.

Some goose-neck hitches are configured to address this issue by being able to fold under the bed, leaving a flat area. However, these folding goose-neck hitches quickly become rusted and seize up; especially when the truck bed is exposed to the elements.

One solution is to use smaller capacity tanks placed on an area of the truck bed not occupied by the hitch. For example, Diverse Plastic Tanks Inc. of Mississauga, Ontario, Canada, manufactures a 72-gallon U-shaped pick-up truck tank for placement behind a fifth-wheel hitch and under the trailer. The U-shaped tank does not hold as large a capacity of liquid as do the tanks of the American Tank Company described above, simply because of the smaller dimension required to fit behind the fifth-wheel hitch.

Another solution is to use a tank which has a base foot-print small enough to fit in front of, or behind, a fifth wheel hitch, but which has an increased capacity by virtue of increased height. High profile tanks however have a higher center of gravity, preclude rear vision through the back of a truck's cab and result in decreased aerodynamics.

What is needed is a large capacity thermoplastic truck tank which can be placed on a pick-up truck's bed, whether or not a bed-mounted hitch is present, having a lower center of gravity and providing for rear vision.

SUMMARY OF THE INVENTION

A truck tank is provided for placement in the bed of a truck, the tank having a recessed bottom for accommodating a hitch, mounted in the bed of the truck.

In one broad aspect of the invention, the truck tank comprises:

a top wall, a bottom wall having a substantially flat base, and a circumferential side wall extending between the bottom wall and the top wall for contain liquids; and a raised recess formed in the bottom wall and sized for spacing the bottom wall from the hitch when the tank is placed in the bed.

The flat portion of the base of the tank contacts the bed of the truck, while the raised recessed portion receives the hitch. Preferably, the cross-section of the recess is arch-shaped. More preferably, the side walls have two side portions contoured, in a step-like fashion, to accommodate the wheel wells of the truck bed. The tank is a typically a thermoplastic tank, having a port for receiving and discharging fluids and a drain.

In another embodiment of the invention, the recess is further extended as a groove along the tank and extends out to a side wall so as to form an access. The access and groove facilitate sliding placement of the tank onto the truck's bed. Where the tank extends the width of the truck bed to incorporate the wheel well portions, the groove is aligned parallel to the wheel well portions.

BRIEF DESCRIPTION OF THE DRAWINGS

The patent or application file contains at least one drawing executed in color. Copies of this patent or patent application with color drawing(s) will be provided by the Office upon request and payment of the necessary fee.

DETAILED DESCRIPTION OF THE PREFERRED EMBODIMENTS

Having reference to FIGS. 1–4, one embodiment of a truck tank 10 is shown. The tank 10 is generally circular in form and comprises a top wall 12 and a substantially flat bottom wall 14 which is supported on the truck bed 26. A circumferential side wall 16 extends between the top and bottom walls 12, 14. The top, bottom and side walls 12, 14, 16 cooperate to contain liquid. For larger tanks adapted to pickup trucks, the side wall 16 can have two portions 16a, 16b which are contoured, in a step-like fashion, so to accommodate the wheel wells 24 of the truck bed 26 (See FIG. 4). The tank 10 further comprises a port 28 for receiving or discharging fluid.

Figure 1:
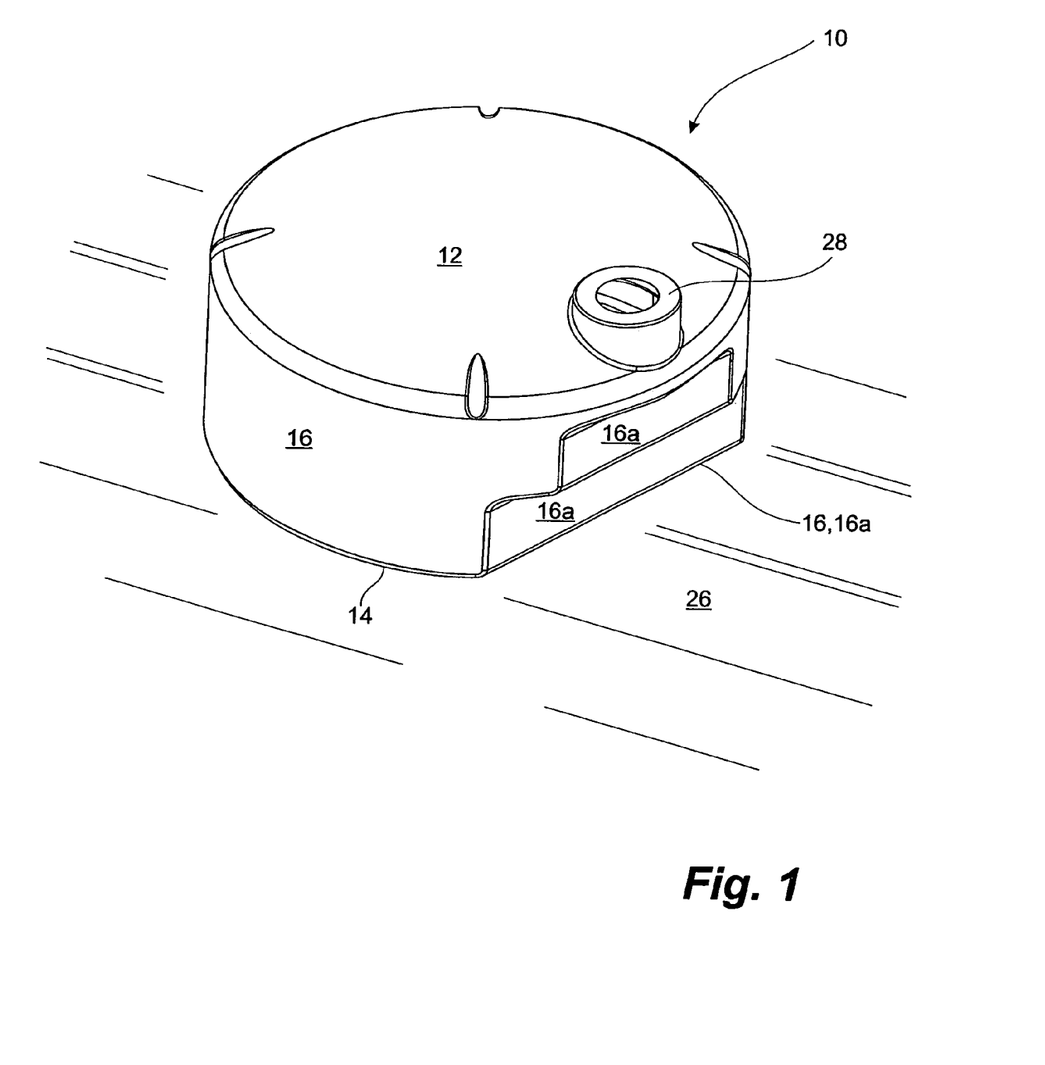
FIG. 1 is a top perspective view of one embodiment of the invention.
Figure 2:
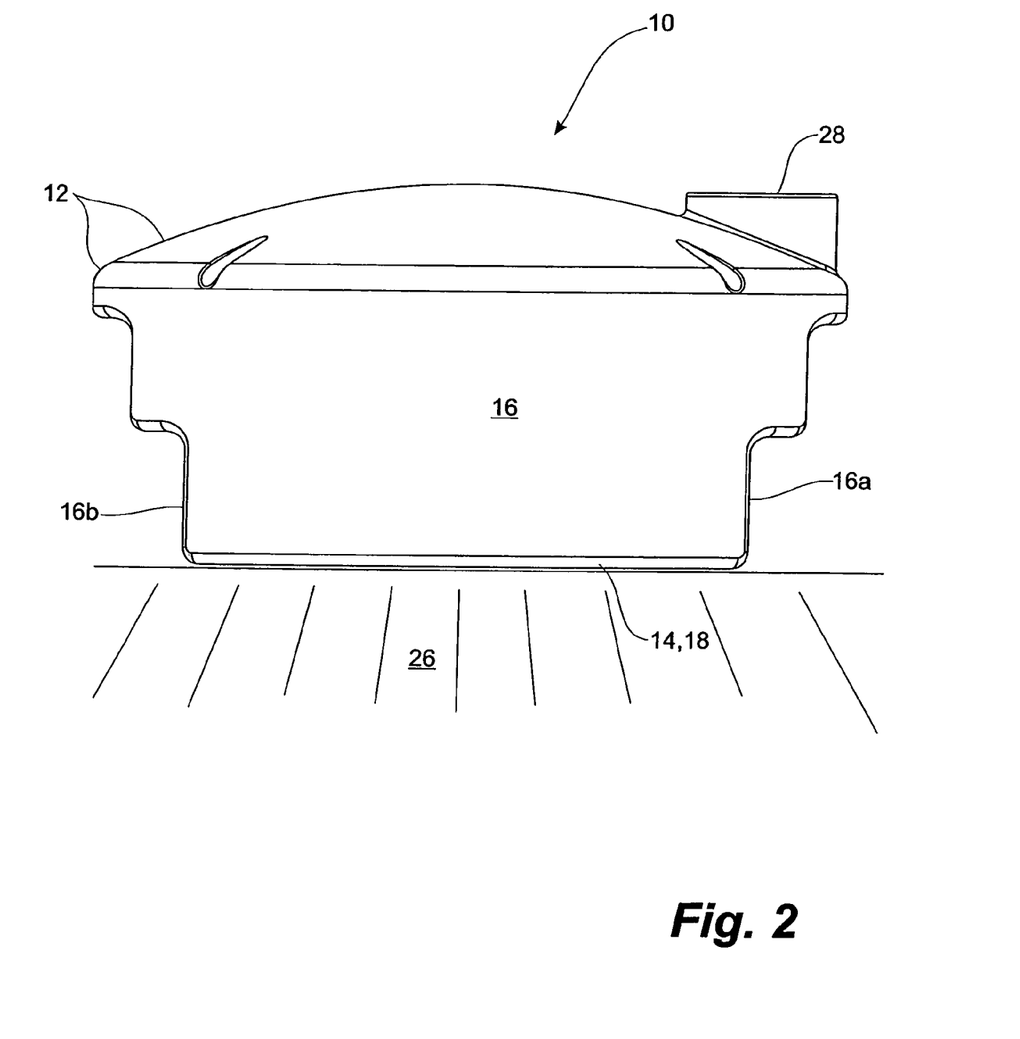
FIG. 2 is a front view of the invention according to FIG. 1.
Figure 3:
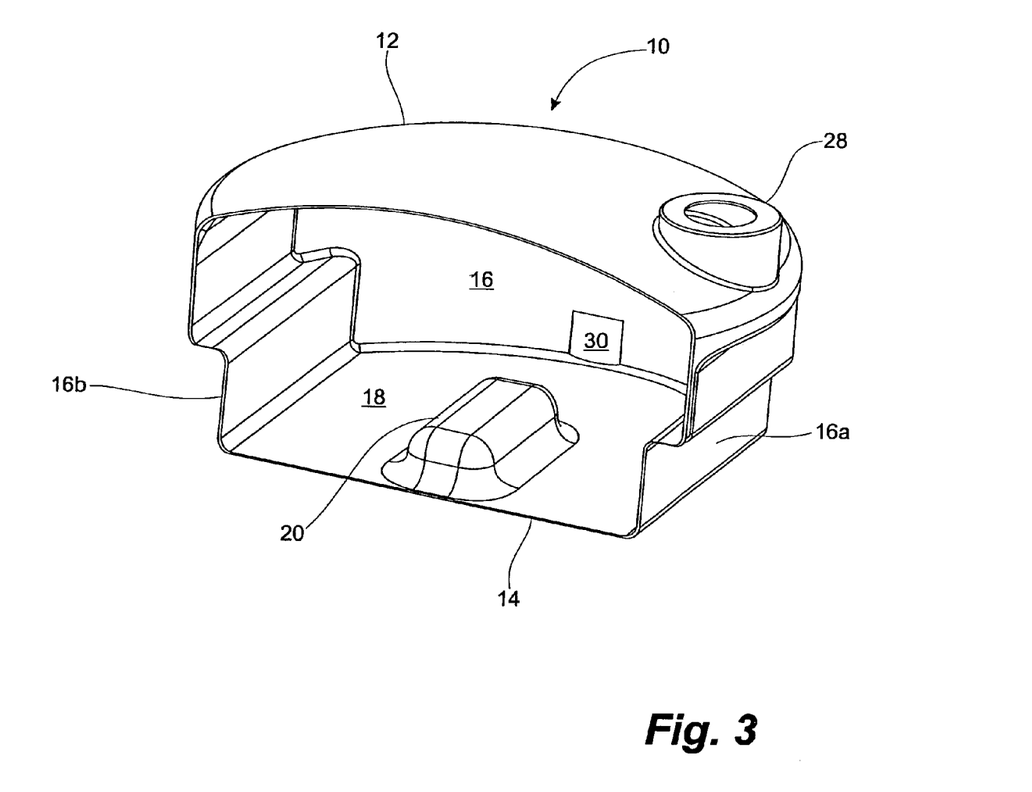
FIG. 3 is a cross-sectional perspective view of the invention according to FIG. 1.
Figure 4:
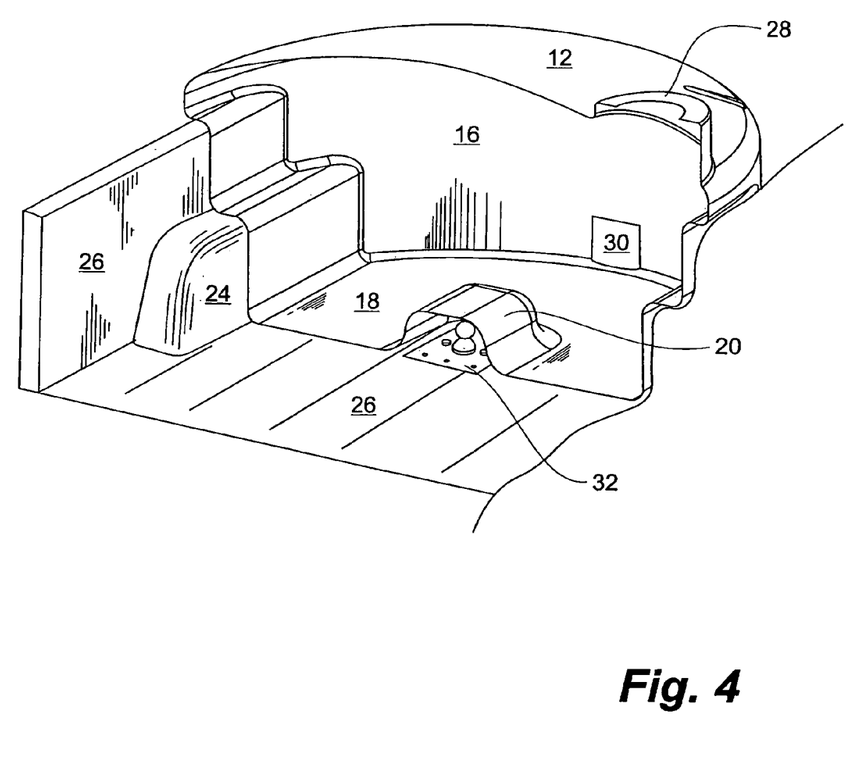
FIG. 4 is a cross-sectional perspective view of the invention according to FIG. 1 which is placed on a truck bed with a goose-neck hitch.
Figure 5:
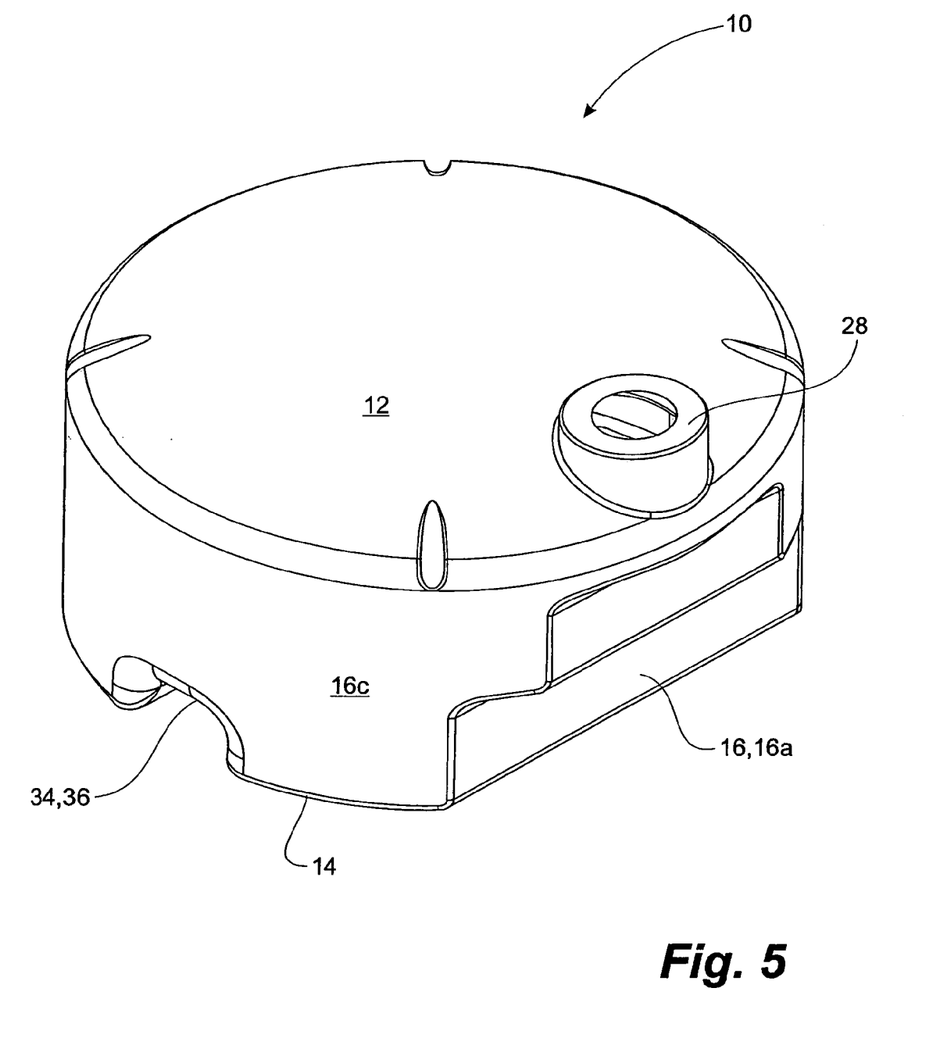
FIG. 5 is a top perspective view of another embodiment of the invention.
Figure 6:
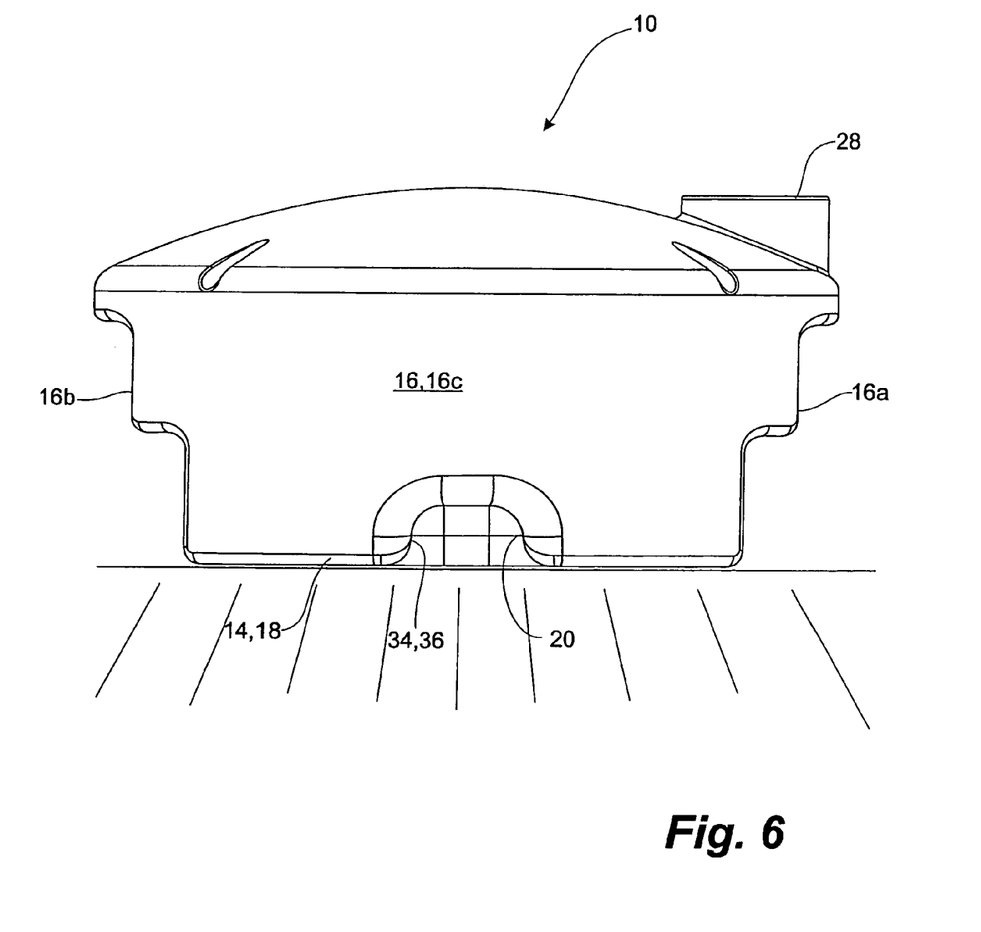
FIG. 6 is a front view of the invention according to FIG. 5.

With reference to FIGS. 3 and 4, the bottom wall 14 of the tank further comprises a raised recess 20 for accommodating a protuberance such as a trailer hitch. The recess 20 is sized for spacing the tank 10 from the hitch (FIG. 4), the recess 20 overlying and encircling the hitch, and thereby avoiding contact therebetween and probable punctures. As shown in FIG. 3, a drain 30 may be provided to assist with emptying the tank 10.

Preferably, the cross-section of the recess 20 is arch-shaped. An arch is an inherently strong cross section for supporting the hydrostatic pressure of the stored liquid. Alternatively, the cross section of the recess 20 may be otherwise configured. Persons of skill the art, through structural modeling, understand that recesses of other cross-sections may require reinforcement to provide the necessary support.

Typically, the tank is constructed from a thermoplastic such as the medium density polyethylene (MDPE) NOVAPOL® TR-0338 from Nova Chemical of Calgary, Alberta, Canada.

With reference to FIG. 4, illustrating the tank 10 in service, the truck tank 10 is shown placed on a truck's bed 26, the bed 26 having an upwardly projecting goose-neck or similar type of hitch 32. The tank 10 is lowered onto the truck bed 26 with the recess 20 over the hitch 32. With proper placement, the bottom wall 14 of the tank 10 contacts the bed 26 while the recess 20 extends over and remains spaced from the hitch 32. The recess 20 is sufficiently raised, relative to the base 18, so as to accommodate the hitch 32. In this manner, the tank 10 can be placed on the bed 26 without having to remove or fold-down the hitch 32.

Adapted to a conventional pickup truck, dimensions for a tank are approximately as follows: the diameter of the top wall 12 is 67.5 inches, the height of the tank 10 (from bottom wall 14 to the top of the top wall 12) is 36 inches, the length of the bottom of the side wall portions 16a, 16b are 45 inches, the distance between the bottom of the side portions 16a, 16b is 48 inches, the height of the recess 20 is 5.25 inches, the length and width of the recess (at it's lowest point) are 29 inches and 15.75 inches respectively, and overall wall thickness is 0.188 inches.

A tank 10, having dimensions as described above, holds approximately 425 US gals while still providing a low center of gravity, allowing for rear vision out the back of a truck cab, and accommodating a goose-neck or similar type of hitch 32. Tanks of other dimensions may be utilized depending on the desired liquid holding capacity or center of gravity placement. However, in such a case the recess 20 must still be of sufficient size to accommodate the hitch 32, which is typically 4 to 5 inches in height above the truck's bed 26.

Second Embodiment

Having reference to FIGS. 5–8 and 9, a second embodiment of a truck tank 10 is shown. Again, a large tank is illustrated having side wall portions 16a,16b for adapting to wheel wells in the bed 26.

In this embodiment, the recess 20 is elongated so as to form a groove 34 extending from a point within the bottom wall 14 to a point on the side wall 16. Where the tank has been adapted to the wheel wells, the groove extends parallel to the wheel wells and along a longitudinal axis of the truck. Best seen in FIGS. 7 and 8, the groove 34 extends out to a front portion 16c of the side wall 16 to form an access 36. Applied to a tank 10 which is sized as set forth in the previous embodiment, the groove 34 is approximately 56" long and has an arch-shaped cross-section.

Figure 7:
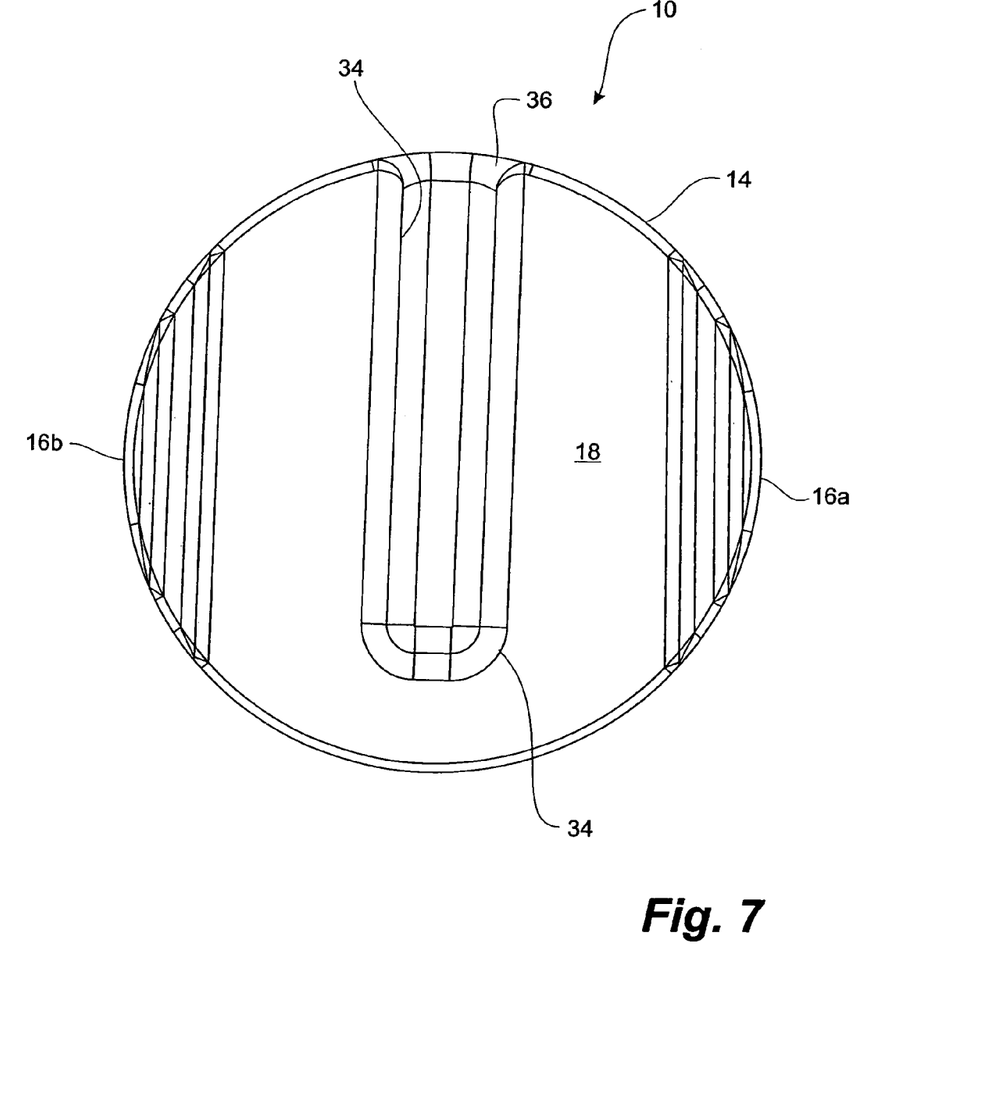
FIG. 7 is a bottom view of the invention according to FIG. 5.
Figure 8:
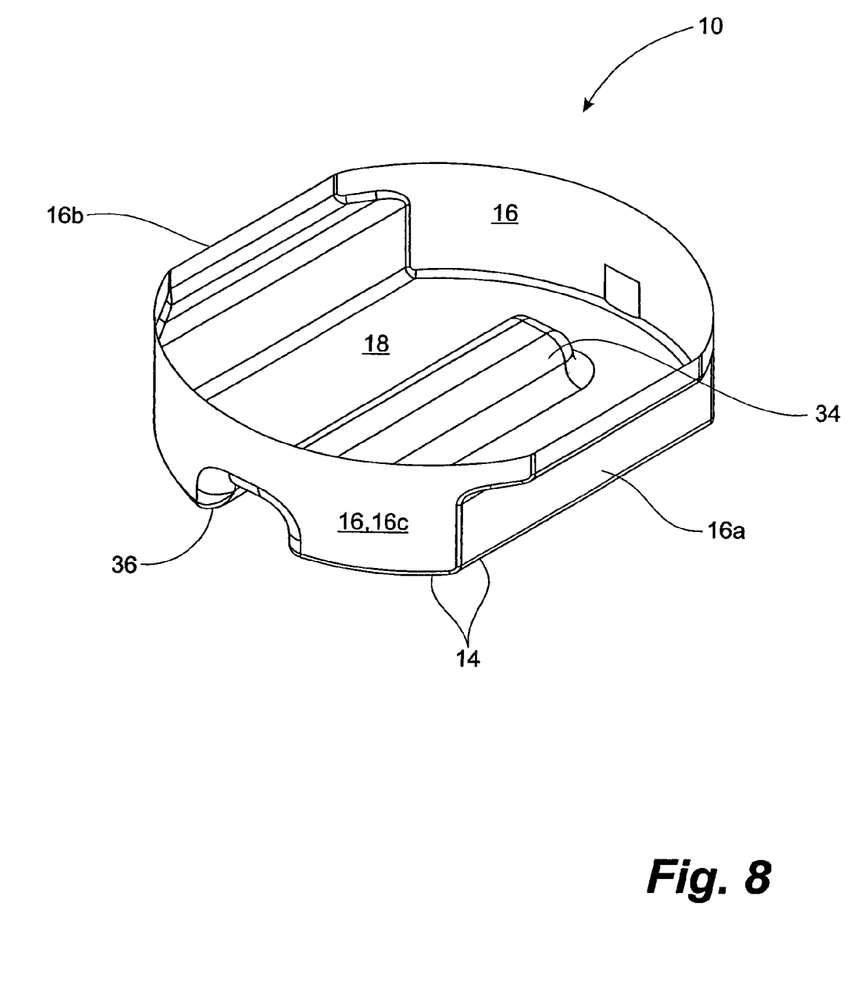
FIG. 8 is a bottom view of the invention according to FIG. 5.

By extending the groove 34 to the front portion 16c of the side wall 16, an alternate technique for placement of the tank 10 onto a truck bed 26 is facilitated. As well as being capable of being directly lowered over the hitch, the tank can also be lowered or placed (typically in a substantially empty state) through the tailgate portion of the truck's bed 26 with the groove aligned with the hitch. The tank is slid forward with the groove aligned over the hitch 32 until the tank is in place—the hitch 32 having been spaced from the tank at all times due to the access 36 through the groove 34. A tank having wheel well portions aids in aligning the groove as the tank is placed.

The groove 34 results in some loss in tank storage volume which can be counteracted by a slight increase in the dimensions the tank 10 elsewhere, such as through a slight increase in height.

Example

A stress analysis modeling was conducted to check the deflection of a rotationally molded truck tank of the second embodiment. The material information as listed in Table 1 was used in conducting the finite element analysis (FEA) for the tank.

TABLE 1

| | |
|---|---|
| Material | Novapol TR-0338 MDPE |
| Flexural Modulus | 124,700 psi |
| Yield Strength | 3,000 psi |
| Ultimate Strength | 4,221 psi |
| Density | 0.0339 lbs/in$^3$ |
| Mass Density | 8.78 × 10$^{-5}$ lbs · s$^2$/in$^4$ |

All internal faces of the tank were loaded assuming the specific weight of water to be 0.036 lbs/in$^3$, to emulate the hydrostatic pressure of the tank full of water at temperatures of 5° to 40° C. The bottom of the tank was restrained as if it were supported on a flat surface that allowed minimal deflection such as the bed of a truck box. The tank model used in the analysis was equivalent to the second embodiment having a groove recess shown in FIGS. 5–8 with a wall thickness of 0.188 inches and an internal volume of 95,690 in$^3$ (414 US gal.).

Figure 9:
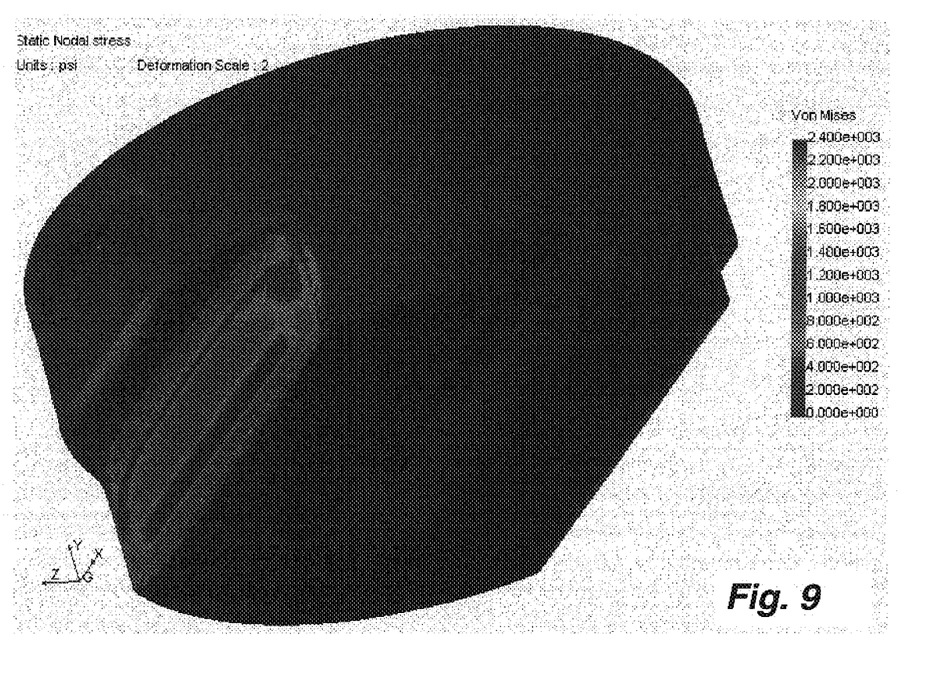
FIG. 9 is a finite element analysis model showing Von Mises stress distribution for the embodiment of FIG. 5 under a hydrostatic load.

As shown in FIG. 9 in the FEA results, the inherently strong arched recess area only attained minimal stress in the order of 200–300 psi. Unrelated to the recess, maximal deflection occurred in the flat side wall portions adjacent and typically supported by the wheel wells and maximal stresses of up to 2400 psi occurred at bottom corners adjacent the wheel well side walls. The FEA results proved that the arch-shaped recess was significantly overdesigned and much latitude is available to apply variable designs for the recess cross-section The embodiments of the invention in which an exclusive property or privilege is being claimed are defined as follows:

1. A truck tank in combination with a bed of a truck, the bed having a hitch projecting therefrom, the tank comprising:
   a top wall, a bottom wall having a substantially flat base supported on the bed, and a circumferential side wall extending between the bottom wall and the top wall for contain liquids; and
   a raised recess formed in the bottom wall and sized for spacing the bottom wall to overlie and encircle the hitch when the tank is supported in the bed.

2. The truck tank of claim 1 wherein the recess is arch-shaped in cross-section.

3. The truck tank of claim 1 wherein the recess extends as a groove to the side wall, the groove sized for spacing the bottom wall to overlie and encircle the hitch when the tank is supported in the bed by sliding the tank over the hitch.

4. The truck tank of claim 3 wherein the groove is arch-shaped in cross-section.

5. The truck tank of claim 1 wherein the truck has wheel wells projecting laterally into the bed, the side wall further comprising side wall portions contoured in a step-like fashion to accommodate the wheel wells.

6. The truck tank of claim 5 wherein the recess is arch-shaped in cross-section.

7. The truck tank of claim 5 wherein the recess extends as a groove to the side wall, the groove sized for spacing the bottom wall to overlie and encircle the hitch when the tank is supported in the bed by sliding the tank over the hitch.

8. The truck tank of claim 7 wherein the groove is arch-shaped in cross-section.

9. The truck tank of claim 1 wherein the tank is a one-piece thermoplastic tank.

10. The truck tank of claim 1 wherein the tank is a one-piece thermoplastic tank made from a medium density polyethylene.

11. The truck tank of claim 1 wherein the top further comprises a port for receiving or discharging fluid.

* * * * *